United States Patent
Sung et al.

(10) Patent No.: US 12,411,507 B2
(45) Date of Patent: Sep. 9, 2025

(54) PRESSURE REGULATOR AND METHOD FOR REGULATING THE SAME

(71) Applicants: Hyundai Motor Company, Seoul (KR); Kia Corporation, Seoul (KR)

(72) Inventors: Yu Hyun Sung, Seoul (KR); Byungwoo Moon, Gunpo-Si (KR); Juhyung Han, Hwaseong-Si (KR); Yeongjun Kwon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 417 days.

(21) Appl. No.: 17/977,692

(22) Filed: Oct. 31, 2022

(65) Prior Publication Data

US 2023/0140942 A1 May 11, 2023

(30) Foreign Application Priority Data

Nov. 8, 2021 (KR) ........................ 10-2021-0151969

(51) Int. Cl.
  *G05D 22/02* (2006.01)
  *B01D 53/22* (2006.01)
  *B60R 16/02* (2006.01)

(52) U.S. Cl.
  CPC ............ *G05D 22/02* (2013.01); *B01D 53/22* (2013.01); *B60R 16/02* (2013.01)

(58) Field of Classification Search
  None
  See application file for complete search history.

(56) References Cited

U.S. PATENT DOCUMENTS

2023/0034108 A1 * 2/2023 Yano .................... H05K 5/0214

FOREIGN PATENT DOCUMENTS

DE          4307028 A1 *  3/1994  ......... B01D 46/0043

OTHER PUBLICATIONS

English language machine translation for DE 4307028 A1. Retrieved from translationportal.epo.org on Feb. 13, 2025. (Year: 2025).*

* cited by examiner

*Primary Examiner* — Duane Smith
(74) *Attorney, Agent, or Firm* — Morgan, Lewis & Bockius LLP

(57) ABSTRACT

A pressure regulator and a method for regulating the same is for predicting occurrence of dew condensation inside components of a vehicle so that the cause of the occurrence of dew condensation is removed in advance before occurrence of dew condensation. The pressure regulator includes a case in which an opening is provided at one end of the case, an outlet is provided at the other end of the case, and the opening is provided to be inserted into a housing of the component, a fan provided inside the case and a filter provided inside the case, the filter allowing gas to be discharged from the inside of the component to the outside of the component while blocking inflow of moisture from the outside of the component to the inside of the component.

15 Claims, 3 Drawing Sheets

PRESSURE REGULATOR AND METHOD FOR REGULATING THE SAME

CROSS-REFERENCE TO RELATED APPLICATION(S)

The present application claims priority to Korean Patent Application No. 10-2021-0151969, filed on Nov. 8, 2021 the entire contents of which is incorporated herein for all purposes by this reference.

BACKGROUND OF THE PRESENT DISCLOSURE

Field of the Present Disclosure

The present disclosure relates to a pressure regulator for preventing an occurrence of dew condensation inside a component.

Description of Related Art

The role of an electrification component such as a motor, Hybrid Starter & Generator (HSG), Hybrid Power Control Unit (HPCU), and On-Board Charger (OBC) is very important, because eco-friendly vehicles (electric vehicles or hybrid vehicles) use electrical energy.

During operation of such an electrification component, temperature and pressure inside the electrification component inevitably rise due to the supply of current. In the instant case, dew condensation may occur inside the electrification component due to external environmental conditions (low temperature or high humidity). Because the electrification component operates by receiving electrical energy, preparation is required so that the dew condensation does not occur inside the electrification component.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a pressure regulator and a method for regulating the same for predicting the occurrence of the dew condensation inside components of a vehicle so that the cause of the occurrence of the dew condensation is removed in advance before the occurrence of the dew condensation.

Additional aspects of the present disclosure will be set forth in part in the description which follows, and in part, will be obvious from the description, or may be learned by practice of the present disclosure.

In accordance with one aspect of the present disclosure, a pressure regulator provided on a component of a vehicle to discharge gas inside the component to outside of the component includes a case in which an opening is provided at a first end portion of the case, an outlet is provided at a second end portion of the case, and the opening is provided to be inserted into a housing of the component, a fan provided inside the case and a filter provided inside the case, the filter allowing gas to be discharged from the inside of the component to the outside of the component while blocking inflow of moisture from the outside of the component to the inside of the component.

The pressure regulator may further include a controller electrically connected to the fan and provided to regulate driving and rotation speed of the fan, wherein the controller, when an occurrence of dew condensation inside the component is predicted, may drive the fan so that the gas inside the component is discharged to the outside of the component to remove a condition for the occurrence of the dew condensation inside the component.

In the above-mentioned pressure regulator, the fan may be provided so that an airflow from the inside of the component toward the outside of the component is formed by rotation of the fan.

In the above-mentioned pressure regulator, the filter may include a membrane film.

In the above-mentioned pressure regulator, the component may include an electrification component of the vehicle.

According to an exemplary embodiment of the present disclosure, a method of regulating a pressure regulator including a case in which an opening is provided at a first end portion of the case, an outlet is provided at a second end portion of the case, and the opening is provided to be inserted into a housing of the component, a fan provided inside the case, and a filter provided inside the case and configured to allow gas to be discharged from inside of the component to outside of the component while blocking inflow of moisture from the outside of the component to the inside of the component includes predicting an occurrence of dew condensation inside the component; and when the occurrence of the dew condensation inside the component is predicted, removing a condition for the occurrence of the dew condensation inside the component by driving the fan to allow gas inside the component to be discharged to the outside of the component.

In the above-mentioned method for regulating the pressure regulator, rotation speed of the fan may be variably regulated according to a condition for the occurrence of the dew condensation inside the component.

In the above-mentioned method for regulating the pressure regulator, the fan may be provided so that an airflow from the inside of the component toward the outside of the component is formed by rotation of the fan.

In the above-mentioned method for regulating the pressure regulator, the filter may include a membrane film.

In the above-described control method for the pressure regulator, the component may include an electrification component of the vehicle.

According to another aspect of the present disclosure, a method of regulating a pressure regulator including a case in which an opening is provided at a first end portion of the case, an outlet is provided at a second end portion of the case, and the opening is provided to be inserted into a housing of the component, a fan provided inside the case, and a filter provided inside the case and configured to allow gas to be discharged from inside of the component to outside of the component while blocking inflow of moisture from the outside of the component to the inside of the component includes predicting an occurrence of dew condensation inside the component; when the occurrence of the dew condensation inside the component is predicted, removing a condition for the occurrence of the dew condensation inside the component by driving the fan during a predetermined time to allow gas inside the component to be discharged to the outside of the component; and outputting an alarm and stopping driving the fan when a cause of the occurrence of the dew condensation inside the component is not removed during the predetermined time.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
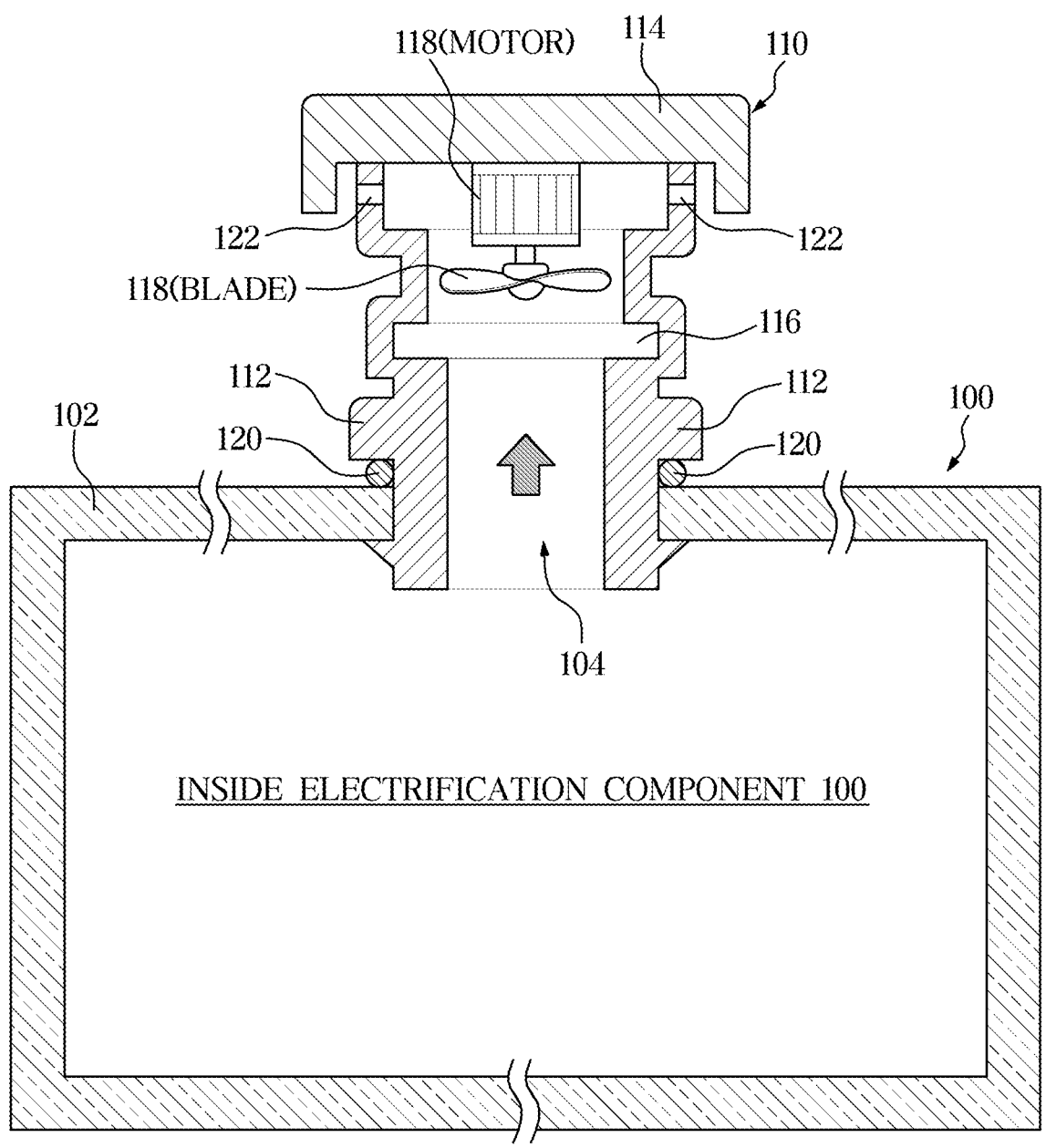
FIG. 1 is a drawing illustrating a structure of a pressure regulator according to an exemplary embodiment of the present disclosure and a coupling state with an electrification component.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

FIG. 1 is a drawing illustrating a structure of a pressure regulator according to an exemplary embodiment of the present disclosure and a coupling state with an electrification component.

In FIG. 1, an electrification component 100 may be provided in a sealed type. A pressure regulator 110 according to the exemplary embodiment of the present disclosure is coupled to a housing 102 of the electrification component 100 through a hole 104 provided on one side of the housing 102 of the electrification component 100.

The pressure regulator 110 according to an exemplary embodiment of the present disclosure may be formed by combining a first case 112 including a space therein and a second case 114 for blocking one side of the first case 112. An outlet 122 is perforated in an upper portion of the first case 112 so that a fluid such as air and moisture may be discharged. That is, an opening of one end portion of the pressure regulator 110 may be provided to be inserted into the housing 102 of the electrification component 100, and the outlet 122 may be formed at the other end portion of the pressure regulator 110, so that air inside the electrification component 100 may be discharged through the outlet 122 of the pressure regulator 110.

An O-Ring 120 may be located between the first case 112 of the pressure regulator 110 and the housing 102 of the electrification component 100, and the O-ring 120 may be sealed. By the sealing action of the O-ring 120, a gap between the pressure regulator 110 and the electrification component 100 may be sealed.

A motor and a blade forming a fan 118 may be provided on the internal surface of the second case 114. When the fan 118 rotates, a fluid flow may be formed from the inside of the electrification component 100 toward the outside of the electrification component 100 through the hole 104. When the rotation speed of the fan 118 is high, the flow of the fluid may be fast, and conversely, when the rotation speed of the fan 118 is low, the flow of the fluid may be slowed down.

Inside the first case 112 of the pressure regulator 110 a membrane film 116 may be provided on an upstream side (a front side) of the fan 118. The membrane film 116 is configured as a filter that allows the gas moving from the inside of the electrification component 100 to the outside of the electrification component 100 by the fan 118 to pass therethrough, but filters out moisture moving from the outside of the electrification component 100 to the inside of the electrification component 100. That is, by the action of the membrane film 116, the gas inside the electrification component 100 may be easily discharged to the outside of the electrification component 100, but moisture and gas outside the electrification component 100 may not easily flow into the inside of the electrification component 100.

A direct current (DC) voltage of 12V may be applied to the motor forming the fan 118. The rotation speed of the fan 118 may be variably regulated through pulse width modulation (PWM) of a DC voltage of 12V.

In the exemplary embodiment of the present disclosure, in consideration of temperature, humidity, and pressure inside the electrification component 100, and the temperature, humidity, and pressure outside the electrification component 100 in a complex manner, the occurrence of the dew condensation inside the electrification component 100 may be predicted in advance, it is determined whether to drive the fan 118 according to the prediction result, and the rotation speed is variably regulated, to prevent the occurrence of the dew condensation inside the electric component 100 in advance due to temperature, humidity, and pressure. The characteristic of preventing the occurrence of the dew condensation in advance will be described in detail with reference to FIG. 2 and FIG. 3 to be described below.

Figure 2:
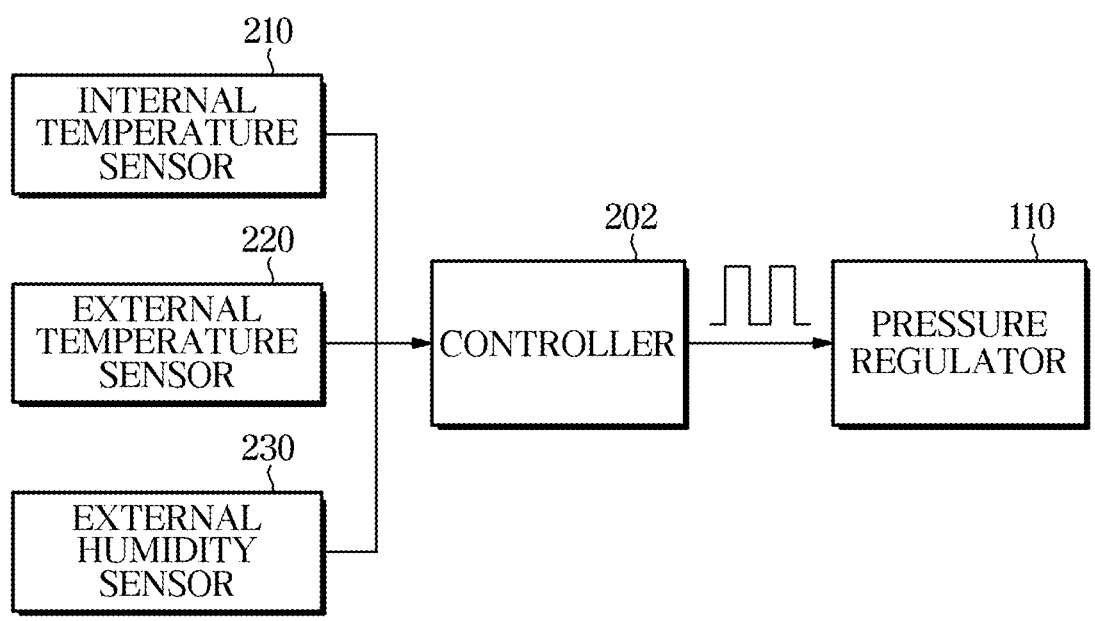
FIG. 2 is a drawing illustrating a control system for regulating the pressure regulator according to an exemplary embodiment of the present disclosure.

FIG. 2 is a drawing illustrating a control system for regulating the pressure regulator according to an exemplary embodiment of the present disclosure.

Referring to FIG. 2, an internal temperature sensor 210, an external temperature sensor 220, and an external humidity sensor 230 may be communicatively connected to an input side of a controller 202 provided to regulate the pressure regulator 110. The internal temperature sensor 210 may be provided to measure the internal temperature of the electrification component 100. The external temperature sensor 220 may be provided to measure the external temperature of the electrification component 100. The external humidity sensor 230 may be provided to measure the external humidity of the electrification component 100. Information on the temperature or humidity measured by the internal temperature sensor 210, the external temperature sensor 220, and the external humidity sensor 230 may be transmitted to the controller 202.

The controller 202 may predict whether the dew condensation occurs inside the electrification component 100 based on the information of the temperature or humidity measured by the internal temperature sensor 210, the external temperature sensor 220, and the external humidity sensor 230. When the occurrence of the dew condensation is predicted, the controller may drive the fan 118 of the pressure regulator 110 and regulate the rotation speed of the fan 118 to take precautions in advance so that the condition inside the electrification component 100 is removed out of the dew condensation. To the present end, the controller 202 may variably control the power supplied to the motor of the fan 118 by generating a pulse width modulation signal for variably regulating the rotation speed of the fan 118.

Figure 3:
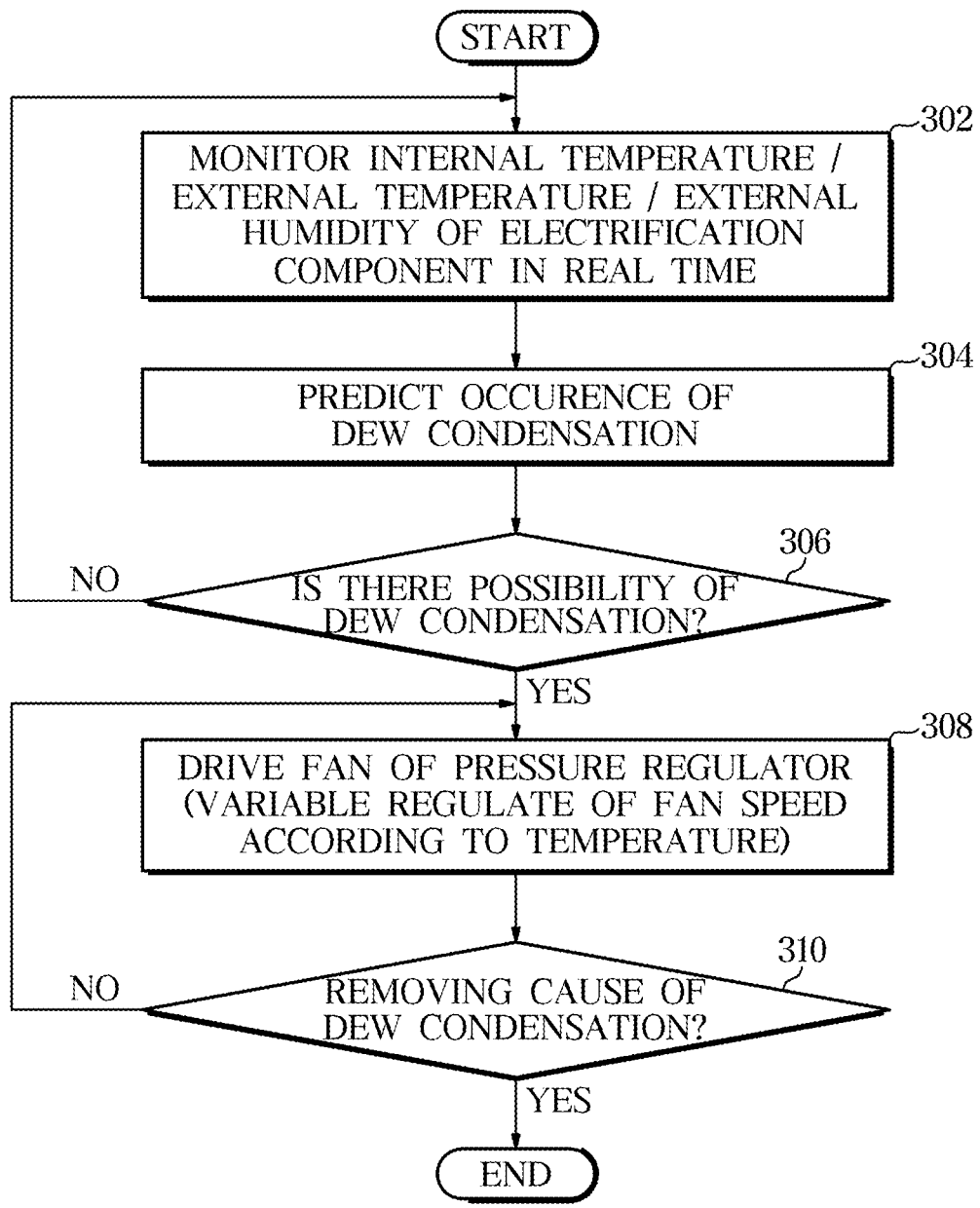
FIG. 3 is a drawing illustrating a method of regulating the pressure regulator for preventing the dew condensation of the electrification component according to an exemplary embodiment of the present disclosure.

FIG. 3 is a drawing illustrating a method for regulating the pressure regulator for preventing the dew condensation of the electrification component according to an exemplary embodiment of the present disclosure.

The controller 202 may monitor the internal temperature, external temperature, and external humidity of the electrification component 100 in real time through the internal temperature sensor 210, the external temperature sensor 220, and the external humidity sensor 230 (302).

Furthermore, the controller 202 may predict an occurrence of the dew condensation inside the electrification component 100 from the result of real-time monitoring of the internal temperature, external temperature, and external humidity of the electrification component 100 (304). That is, the controller 202 may confirm whether the humidity inside the electrification component 100 is saturated or unsaturated through the determination of a formula provided in advance based on the internal temperature, the external temperature, and the external humidity of the electrification component 100. When the humidity inside the electrification component 100 is close to the saturation condition, the controller 202 may predict that there is a possibility of the occurrence of the dew condensation inside the electrification component 100. Conversely, when the humidity inside the electrification component 100 is an unsaturated condition, the controller may predict that there is not a possibility of the occurrence of the dew condensation inside the electrification component 100. To the present end, a reference value for classifying the saturated condition or the unsaturated condition may be set in advance, and when an internal humidity of the electrification component 100 exceeds the reference value, the internal humidity is recognized as near to the saturation condition and the controller 202 may predict that there is a possibility of the occurrence of the dew condensation. Conversely, when an internal humidity of the electrification component 100 does not exceed the reference value, the controller 202 may predict that there is not a possibility of occurrence of the dew condensation. To predict the occurrence of the dew condensation, not only the internal humidity of the electrification component 100 but also the internal temperature, the external temperature, and the external humidity may be considered in combination.

When there is a possibility of the occurrence of the dew condensation inside the electrification component 100 (Yes in operation 306), the controller 202 may drive the fan 118 of the pressure regulator 110 so that the air inside the electrification component 100 is discharged to the outside (308). When the temperature, pressure, and humidity inside the electrification component 100 may be lowered by the air discharge through the pressure regulator 110, the cause of the occurrence of the dew condensation inside the electrification component 100 may be removed. In the instant case, the controller 202 may variably control the rotation speed of the fan 118 of the pressure regulator 110 according to the temperature inside the electrification component 100. Furthermore, when the internal temperature of the electrification component 100 rises, the controller 202 may discharge the internal heat of the electrification component 100 to the outside by driving the fan 118. Furthermore, when the internal temperature of the electrification component 100 decreases, the moisture from the outside of the electrification component 100 may not flow into the inside of the electrification component 100 by the action of the membrane film 116.

When there is not a possibility of the occurrence of the dew condensation inside the electrification component 100 (No in operation 306), the controller 202 may return to 302, and the internal temperature, external temperature, and external humidity of the electrification component 100 may be continuously monitored in real time through the internal temperature sensor 210, the external temperature sensor 220, and the external humidity sensor 230.

When the temperature, humidity, and pressure inside the electrification component 100 are lowered through driving the fan 118 of the pressure regulator 110, and the cause of the occurrence of the dew condensation inside the electrification component 100 are removed (Yes in operation 310), so that the controller 202 may stop driving the fan 118 of the pressure regulator 110. When the cause of the occurrence of the dew condensation inside the electrification component 100 is not removed (No in 310), the controller 202 may control the fan 118 of the pressure regulator 110 until the cause of the occurrence of condensation is removed continuously. Alternatively, the controller 202 may output an alarm and stop driving the fan 118 when the cause of the occurrence of the dew condensation in the electrification component 100 is not removed despite driving the fan 118 during a predetermined time period.

The present disclosure may provide a pressure regulator and a method for regulating the same for predicting the occurrence of dew condensation inside a component of a vehicle in advance so that the cause of the occurrence of the dew condensation is removed in advance before the occurrence of dew condensation.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A pressure regulator apparatus provided on a component of a vehicle to discharge gas inside the component to outside of the component, the pressure regulator apparatus comprising:
   a case in which an opening is provided at a first end portion of the case, an outlet is provided at a second end portion of the case, and the opening is provided to be inserted into a housing of the component;
   a fan provided inside the case;
   a filter provided inside the case, the filter allowing the gas to be discharged from the inside of the component to the outside of the component while blocking inflow of moisture from the outside of the component to the inside of the component; and
   a controller electrically connected to the fan and provided to regulate driving and rotation speed of the fan,
   wherein the controller, when an occurrence of dew condensation inside the component is predicted, is configured to drive the fan.

2. The pressure regulator apparatus of claim 1, wherein the fan is provided so that an airflow from the inside of the component toward the outside of the component is formed by rotation of the fan.

3. The pressure regulator apparatus of claim 1, wherein when humidity inside the component is equal to or greater than a predetermined reference value, the controller is configured to conclude that there is a possibility of the occurrence of the dew condensation inside the component.

4. The pressure regulator apparatus of claim 1, wherein the filter includes a membrane film.

5. The pressure regulator apparatus of claim 1, wherein the component includes an electrification component of the vehicle.

6. A method of regulating a pressure regulator apparatus including a case in which an opening is provided at a first end portion of the case, an outlet is provided at a second end portion of the case, and the opening is provided to be inserted into a housing of the component, a fan provided inside the case, and a filter provided inside the case and configured to allow gas to be discharged from inside of the component to outside of the component while blocking inflow of moisture from the outside of the component to the inside of the component, the method comprising:
   predicting, by a controller electrically connected to the fan, an occurrence of dew condensation inside the component; and
   when the occurrence of the dew condensation inside the component is predicted, removing, by the controller, a condition for the occurrence of the dew condensation inside the component by driving the fan to allow the gas inside the component to be discharged to the outside of the component through the filter.

7. The method of claim 6, wherein rotation speed of the fan is variably regulated according to a condition for the occurrence of the dew condensation inside the component.

8. The method of claim 6, wherein the fan is provided so that an airflow from the inside of the component toward the outside of the component is formed by rotation of the fan.

9. The method of claim 6, wherein the filter includes a membrane film.

10. The method of claim 6, wherein the component includes an electrification component of the vehicle.

11. The method of claim 6, wherein when humidity inside the component is equal to or greater than a predetermined reference value, the controller is configured to conclude that there is a possibility of the occurrence of the dew condensation inside the component.

12. A method of regulating a pressure regulator apparatus including a case in which an opening is provided at a first end portion of the case, an outlet is provided at a second end portion of the case, and the opening is provided to be inserted into a housing of the component, a fan provided inside the case, and a filter provided inside the case and configured to allow gas to be discharged from inside of the component to outside of the component while blocking inflow of moisture from the outside of the component to the inside of the component, the method comprising:

predicting, by a controller electrically connected to the fan, an occurrence of dew condensation inside the component;

when the occurrence of the dew condensation inside the component is predicted, removing, by the controller, a condition for the occurrence of the dew condensation inside the component by driving the fan during a predetermined time period to allow the gas inside the component to be discharged to the outside of the component; and outputting, by the controller, an alarm and stopping driving the fan when a cause of the occurrence of the dew condensation inside the component is not removed during a predetermined time period.

13. The method of claim 12, wherein the controller is configured to remove the condition for the occurrence of the dew condensation inside the component by driving the fan to allow the gas inside the component to be discharged to the outside of the component through the filter.

14. The method of claim 12, wherein the filter includes a membrane film.

15. The method of claim 12, wherein when humidity inside the component is equal to or greater than a predetermined reference value, the controller is configured to conclude that there is a possibility of the occurrence of the dew condensation inside the component.

\* \* \* \* \*